United States Patent
Mai et al.

(10) Patent No.: US 7,026,567 B2
(45) Date of Patent: Apr. 11, 2006

(54) TOUCH PANEL

(75) Inventors: Che-Kuei Mai, Hsinchu (TW); Ming-Mo Lo, Changhua (TW)

(73) Assignee: Toppoly Optoelectronics Corp., (TW)

( * ) Notice: Subject to any disclaimer, the term of this patent is extended or adjusted under 35 U.S.C. 154(b) by 0 days.

(21) Appl. No.: 10/976,824

(22) Filed: Nov. 1, 2004

(65) Prior Publication Data
US 2005/0199481 A1  Sep. 15, 2005

(30) Foreign Application Priority Data
Mar. 15, 2004 (TW) .............................. 93106890 A

(51) Int. Cl.
*H01H 1/10* (2006.01)
(52) U.S. Cl. ...................... 200/512; 200/5 A; 345/173; 257/431
(58) Field of Classification Search ........ 345/173–179, 345/206; 428/141, 212; 257/431, 437; 200/512, 200/5 A
See application file for complete search history.

(56) References Cited

U.S. PATENT DOCUMENTS

| 4,896,946 | A  | * | 1/1990  | Suzuki et al. ................ 349/150 |
| 6,034,335 | A  | * | 3/2000  | Aufderheide et al. ........ 200/5 A |
| 6,627,918 | B1 | * | 9/2003  | Getz et al. .................... 257/59 |
| 6,639,163 | B1 | * | 10/2003 | Fukui et al. ................. 200/512 |
| 6,831,241 | B1 | * | 12/2004 | Fukui et al. ................. 200/512 |

FOREIGN PATENT DOCUMENTS

JP          2004094762 A  *  3/2004

* cited by examiner

*Primary Examiner*—Kyung Lee
(74) *Attorney, Agent, or Firm*—Harness, Dickey & Pierce, P.L.C.

(57) ABSTRACT

A touch panel is provided. The touch panel includes a first flexible substrate with a first surface, a second substrate with a second surface facing the first surface, and a masking structure with a first contacting surface and a second contacting surface respectively adjacent to an edge portion of the first flexible substrate and an edge portion of the second substrate. The second contacting surface is wider than the first contacting surface.

10 Claims, 7 Drawing Sheets

TOUCH PANEL

FIELD OF THE INVENTION

The present invention relates to a touch panel, and more particular to a touch panel with a masking structure.

BACKGROUND OF THE INVENTION

Since the touch panel is an input device and has the functions and advantages of several input devices, such as the keyboard, the mouse, the trackball, and the track point, it has become the main trend of the modern input device. In addition, since the input and the output are integrated into the same interface, the touch panel generally has a compact size and an exquisite structure. At present, the touch panel has become one of the most popular input devices for the electronic products, such as the personal digital assistant (PDA), the information appliance (IA), the e-book, the mobile phone handheld personal computer, the global positioning system (GPS) and so on.

In general, a touch panel is formed by two transparent substrates and some soft tails. In which, there might exist some transparent thin films with function of electric conduction on the two transparent substrates. In general, the two transparent substrates are connected together by their edges via some insulating adhesion layers. Please refer to FIG. 1, which is a front view of the display with a touch panel according to the prior art. As shown in FIG. 1, the visible area of the display can be simply divided into three parts, the outline dimension OD, the view area VA, and the active area AA. In which, OD means the area of the display appearance, VA means the view area by eyes, and AA means the effective area of the touch panel, which is able to receive a touch.

Please refer to FIG. 2, which is the diagram of the assembly of the display according to the prior art. As shown in FIG. 2, traditionally, even though a black matrix (BM)(not shown) is always located between VA and AA, there is still a space S frame located between VA and the area of AA+BM. Recently, since a product with a wider visible area of the display 1 is a trend, the frame 3 of the display 1 is made as thin as possible. However, if the frame 3 is over thinned, some light bands or some elements of the display 1 might be exposed through the space S and the values of the products are reduced accordingly.

Please refer to FIGS. 3(A)–(B), which show the relative positions among the substrates and the insulating adhesion layer during the process of being actuated by a touch according to the prior art. However, since a product with a wider visible area of the display is a trend, the frame of the display is made as thin as possible. Accordingly, the insulating adhesion layer might be not completely covered by the frame. As shown in FIGS. 3(A)–(B), when a user performs an input with the silicon rubber 4, the shape of the flexible substrate 11 is changed and the flexible substrate 11 would be connected to the substrate 15 and the dot spacers 14 owing to the pressure came from the silicon rubber 4. After the removal of the silicon rubber 4, the flexible substrate 11 would recover back to its initial state due to its own resilience. However, after a long time usage, some cracks 113 might be naturally appeared on the flexible substrate 11 because of the repeated crush from the insulating adhesion layer 16. Furthermore, the flexible substrate 11 might be broken, and a short circuit or a mis-function of the touch panel 1 might occur accordingly.

In addition to the relevant problems caused by the cracks (as the cracks 113 shown in FIG. 3(B)) appeared on the structure, there might exist a light leak in the prior display, as shown in FIG. 4. FIG. 4 is a schematic diagram showing the light leak appeared in the prior display. As shown in FIG. 4, if the frame 3 is not wide enough, the light 211 reflected from the light guide 21 would not be masked by the frame 3, and the light leak would appear in the conventional display.

In view of aforesaid discussion, to built a touch panel device having more pleasuring appearance, longer lifespan, lower cost, but no light leak is an industrial subject at present.

SUMMARY OF THE INVENTION

In accordance with an aspect of the present invention, a touch panel is provided. The touch panel includes a first flexible substrate with a first surface, a second substrate with a second surface facing the first surface, and a masking structure with a first contacting surface and a second contacting surface respectively adjacent to an edge portion of the first flexible substrate and an edge portion of the second substrate. The second contacting surface is wider than the first contacting surface.

Preferably, the first flexible substrate further includes a touch surface for receiving a touch.

Preferably, the first flexible substrate has a shape change after receiving the touch.

Preferably, the touch panel further includes a first conductive layer located on the first surface.

Preferably, the touch panel further includes a second conductive layer located on the second surface.

Preferably, the first flexible substrate and the second substrate are made of a transparent insulating material.

Preferably, the transparent insulating material is a glass.

Preferably, the transparent insulating material is a plastic.

Preferably, the masking structure is made of an absorbent.

Preferably, the masking structure is black.

In accordance with another aspect of the present invention, a touch panel device is provided. The touch panel device includes a first flexible substrate with a first surface, a frame rimming the first flexible substrate, a second substrate with a second surface facing the first surface, and a masking structure with a first contacting surface and a second contacting surface respectively adjacently to an edge portion of the first flexible substrate and an edge portion of the second substrate. The width of the masking structure is wider than that of the frame, and the second contacting surface is wider than the first contacting surface.

Preferably, the first contacting surface is connected to the first flexible surface, and the second contacting surface is connected to the second surface.

Preferably, the first flexible substrate further includes a touch surface for receiving a touch.

Preferably, the first flexible substrate and the second substrate are made of a transparent insulating material.

Preferably, the masking structure is made of an absorbent.

Preferably, the masking structure is black.

In accordance with another aspect of the present invention, a touch panel device is provided. The touch panel device includes a first flexible substrate with a first surface, a frame rimming the first flexible substrate, a second substrate with a second surface facing the first surface, and a masking structure formed by stacking a plurality of insulating layers and located between an edge portion of the first flexible substrate and an edge portion of the second substrate. One of the plurality of insulating layers is adjacent to the first flexible surface and has a width less than that of a insulating layer located therebelow.

Preferably, the first flexible substrate further includes a touch surface for receiving a touch.

Preferably, the first flexible substrate and the second substrate are made of a transparent insulating material.

Preferably, the masking structure is made of an absorbent.

The above contents and the advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5:
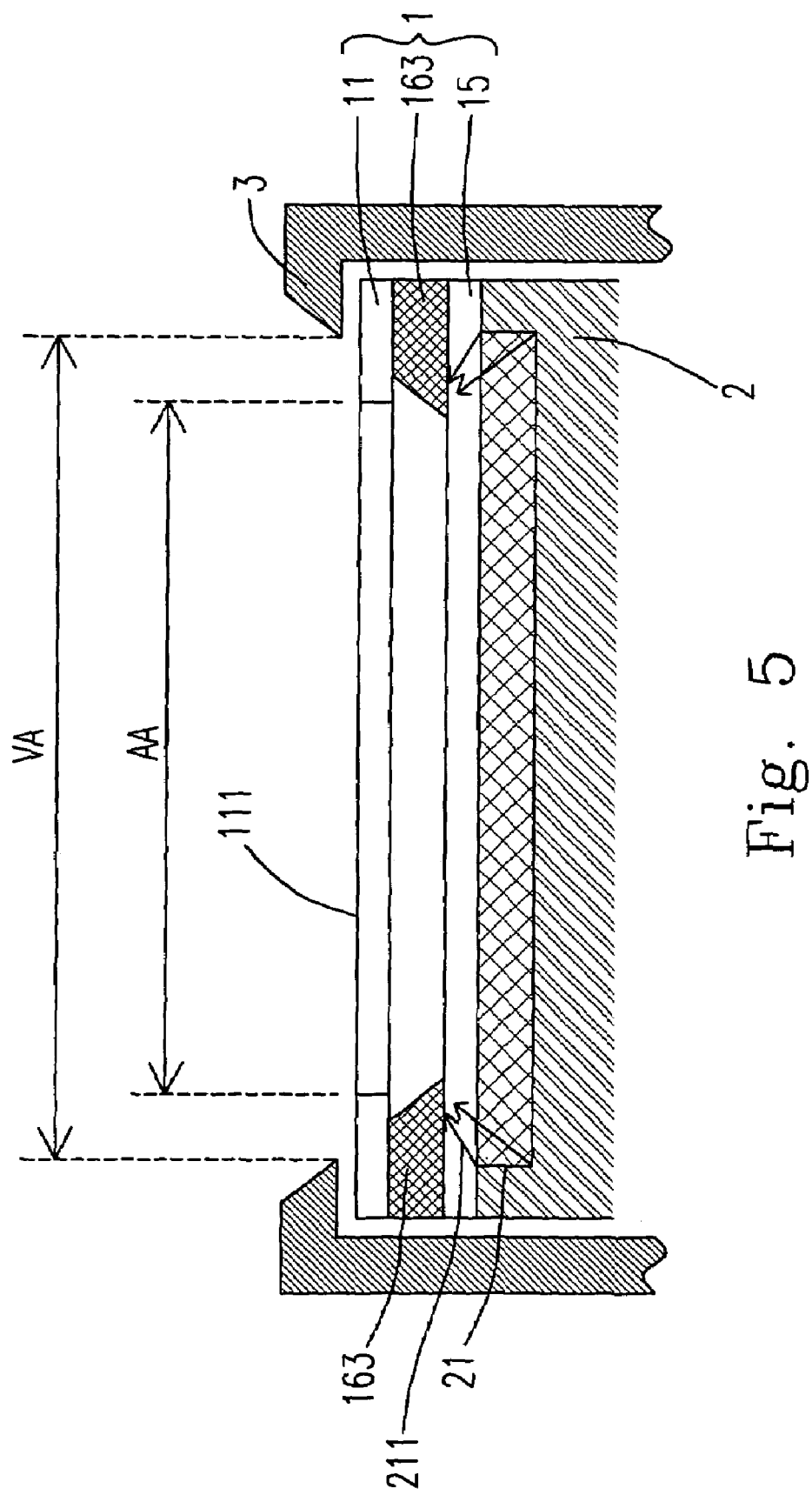
FIG. 5 is a schematic diagram of a touch panel with the masking structure according to a first embodiment of the present invention.
Figure 6A:
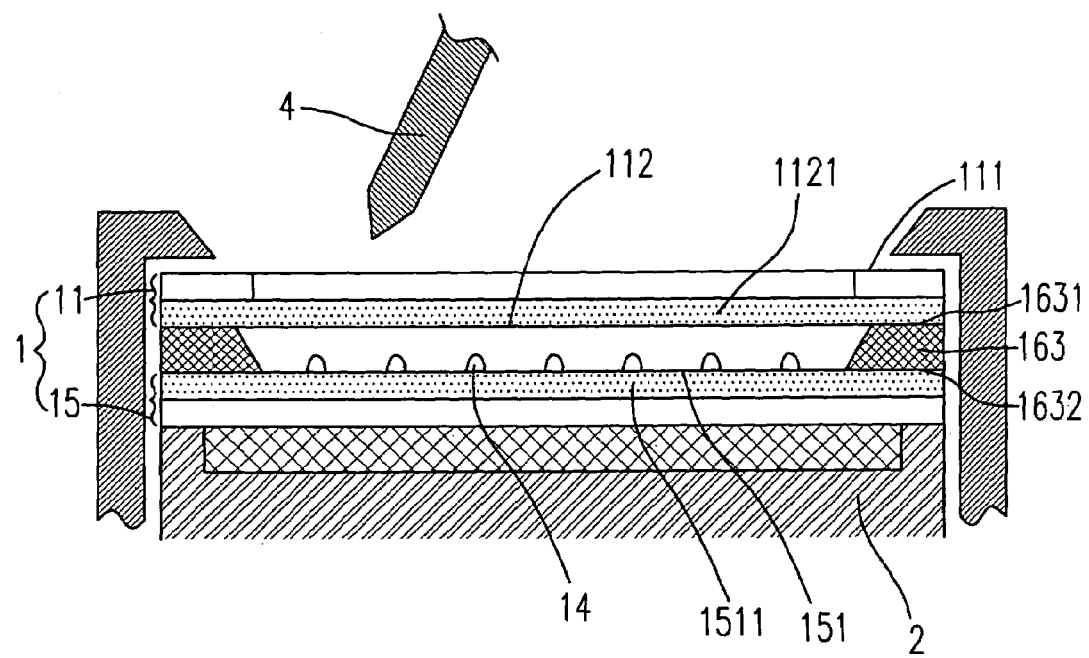
FIG. 6(A) shows the relative positions among the substrates and the insulating adhesion layer before being actuated by a touch according to the first embodiment of the present invention.
Figure 6B:
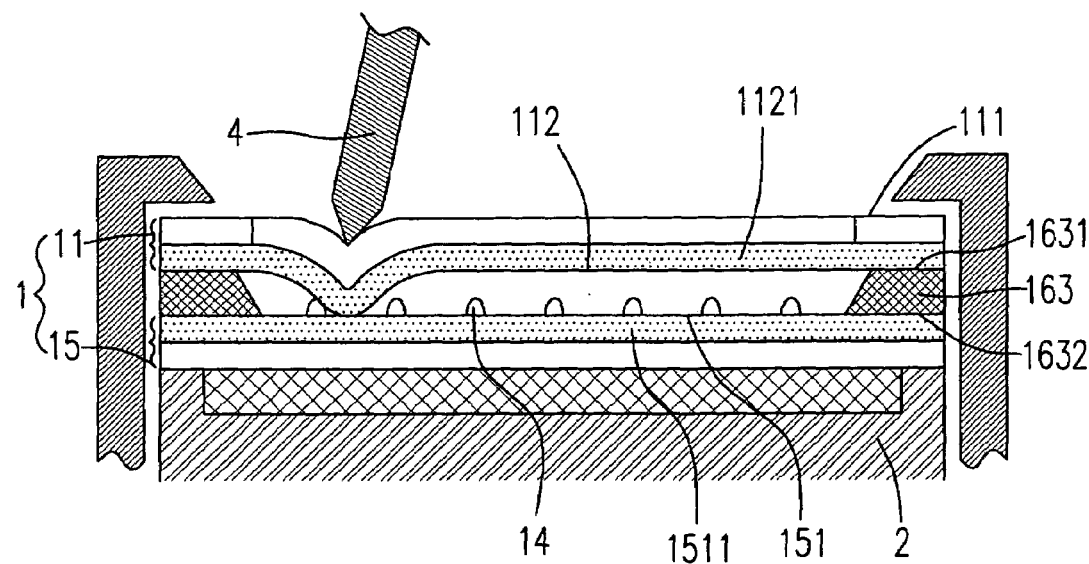
FIG. 6(B) shows the relative positions among the substrates and the insulating adhesion layer after being actuated by a touch according to the first embodiment of the present invention.

Please refer to FIGS. 5, 6(A), and 6(B), wherein FIG. 5 is the schematic diagram of the touch panel with the masking structure according to a first embodiment of the present invention, and FIGS. 6(A)–(B) are the relative positions among the substrates and the insulating adhesion layer before and after being actuated by a touch according to the first embodiment of the present invention. As shown in FIGS. 5, 6(A), and 6(B), the touch panel 1 includes a flexible substrate 11, a substrate 15, and a black insulating adhesion layer 163. Due to the black insulating adhesion layer 163 could be made of an absorbent, the undesired light leak would be avoided. In other words, the black insulating adhesion layer 163 equals to a masking structure. Furthermore, since the thickness of the black insulating adhesion layer 163 could be controlled as that of a conventional insulating adhesion layer, the relevant assembling operation according to the prior art could be applied in the embodiment and no additional adjusting cost would be spent. In general, the flexible substrate 11 and the substrate 15 are made of transparent material, such as a glass or a plastic. In which, the flexible substrate 11 includes a touch surface 111, a surface 112 and a conductive layer 1121. In addition, the touch surface 111 is used to receive a touch, and the shape of the flexible substrate 11 would be changed after receiving the touch. Furthermore, the substrate 15 includes a surface 151, and a conductive layer 1511. And, there are insulating dot spacers 14 disposed between the conductive layer 1121 and the conductive layer 1511. In which, the dot spacers 14 are capable of increasing the precisions of the relevant actuations resulted from the touch. In addition, the black insulating adhesion layer 163 includes a contacting surface 1631 for contacting with the conductive layer 1121 and a contacting surface 1632 for contacting with the conductive layer 1511.

In this embodiment of the present invention, since the black insulating adhesion layer 163 is used to replace the prior insulating adhesion layer, the light 211 (shown in FIG. 5) reflected from the light guide 21 would be masked or absorbed by the black insulating adhesion layer 163 and the fault regarding the light leak of the prior display is overcome. In addition, since some elements, such as the wires and terminals (not shown), of the display module 2, which are undesired to be seen from the appearance of the display module 2, might be covered by the black insulating adhesion layer 163, the appearances and the visions of the products made from the touch panel 1, the display module 2, and the frame 3 are really improved.

Figure 1:
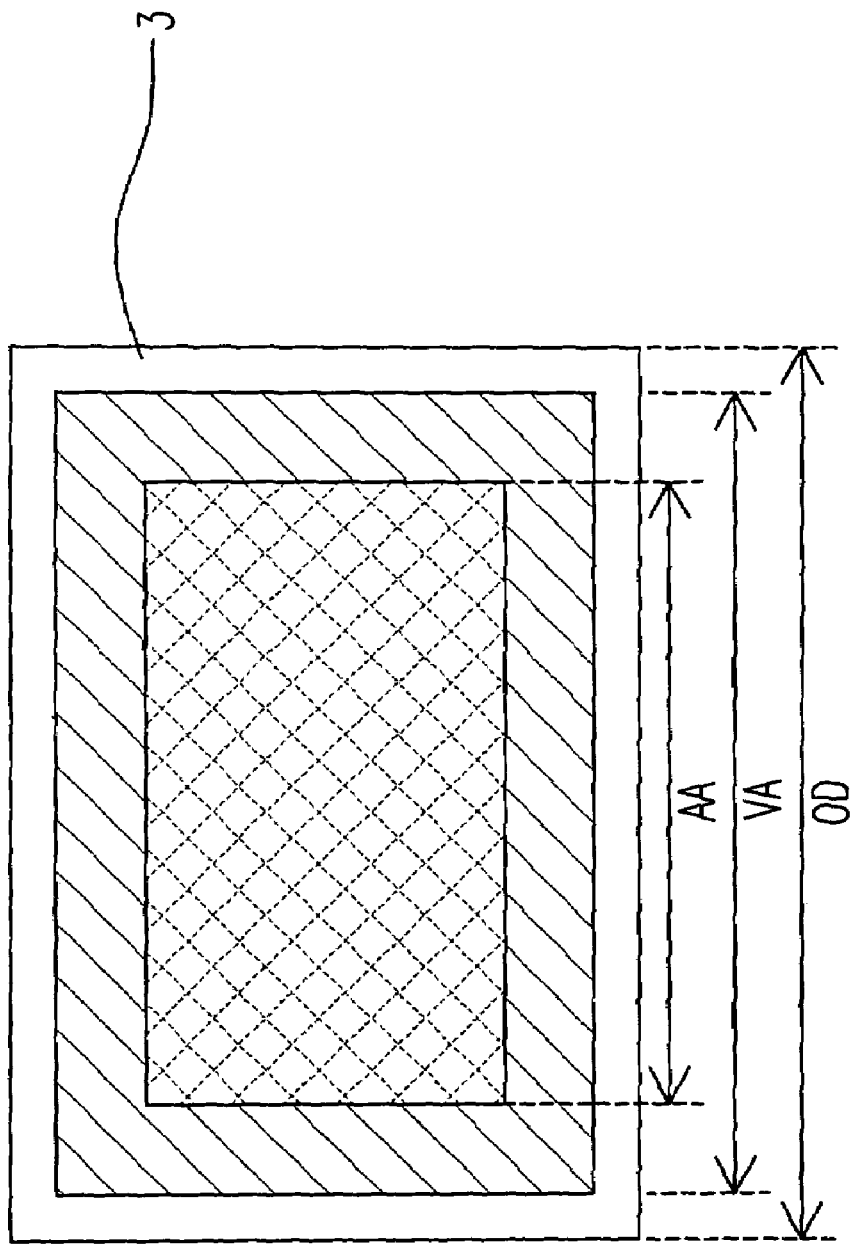
FIG. 1 is a front view of the display with a touch panel according to the prior art.
Figure 2:
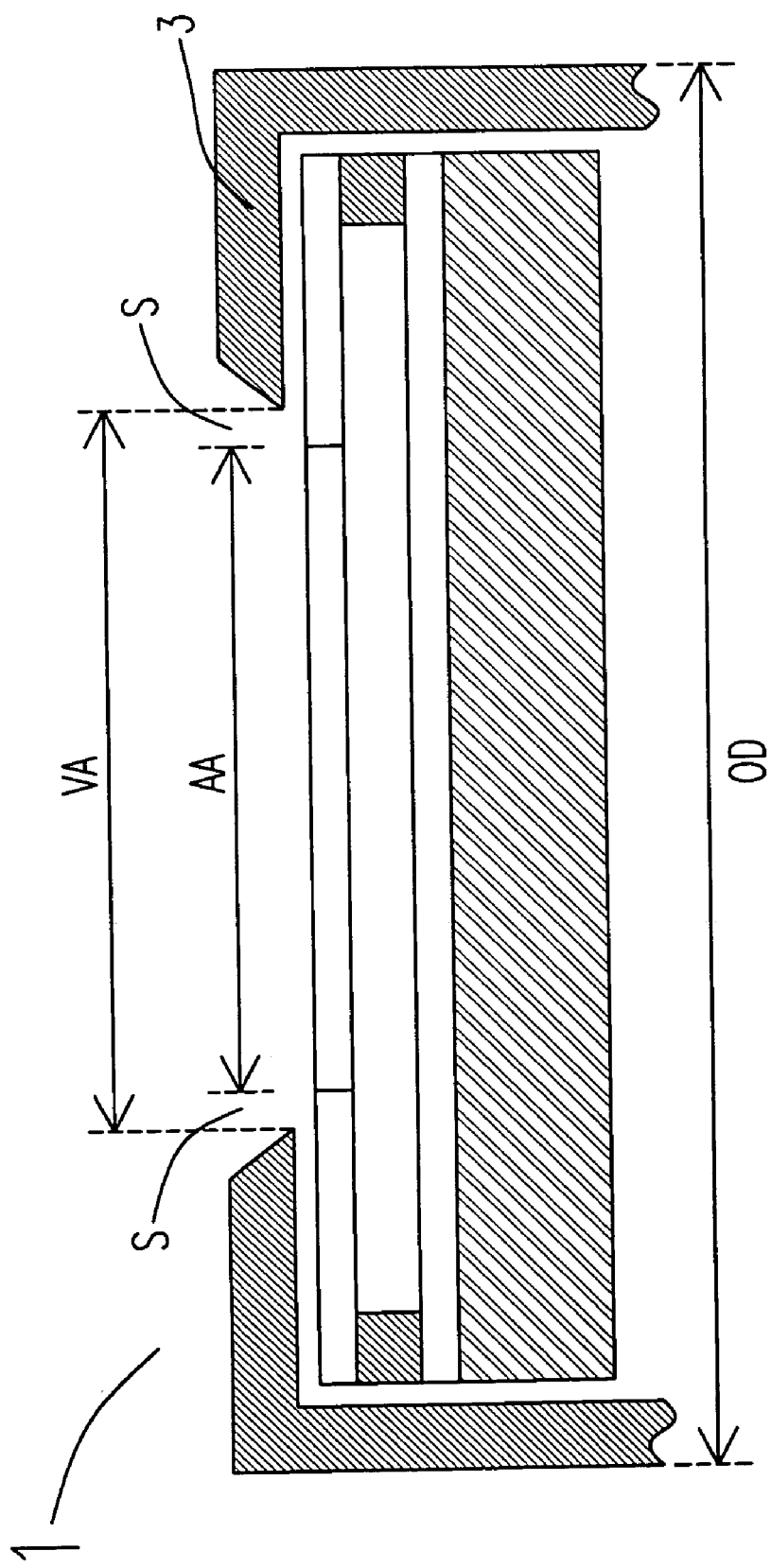
FIG. 2 is a diagram of the assembly of the display with a touch panel according to the prior art.
Figure 3A:
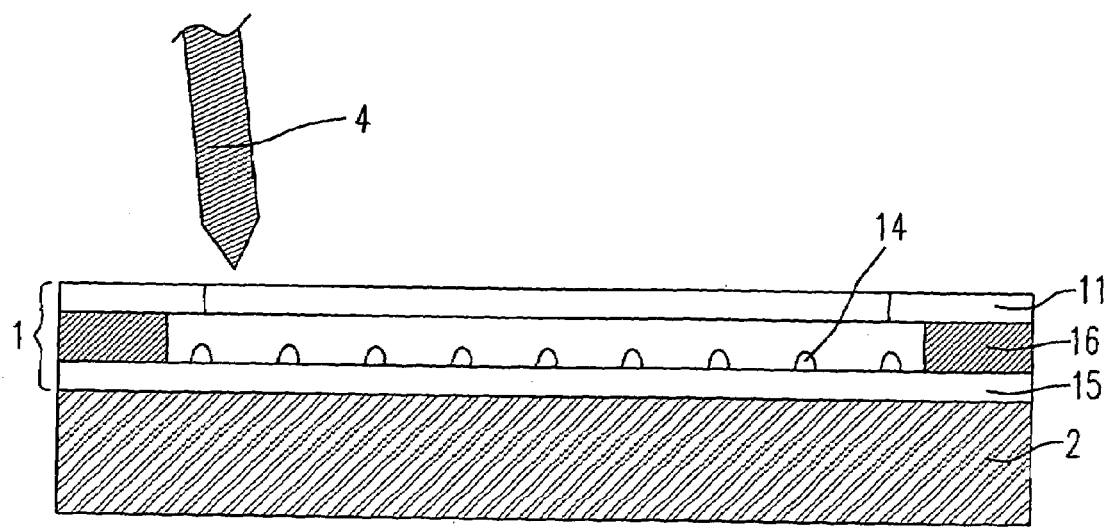
FIG. 3(A) shows the relative positions among the substrates and the insulating adhesion layer before being actuated by a touch according to the prior art.

The thickness of the insulating adhesive layer 163 can be kept the same as that of the prior adhesion layer 16 (as shown in FIG. 3) and this embodiment can certainly be performed with equipments of the prior arts so as to save the costs for manufacturing new equipments.

Figure 3B:
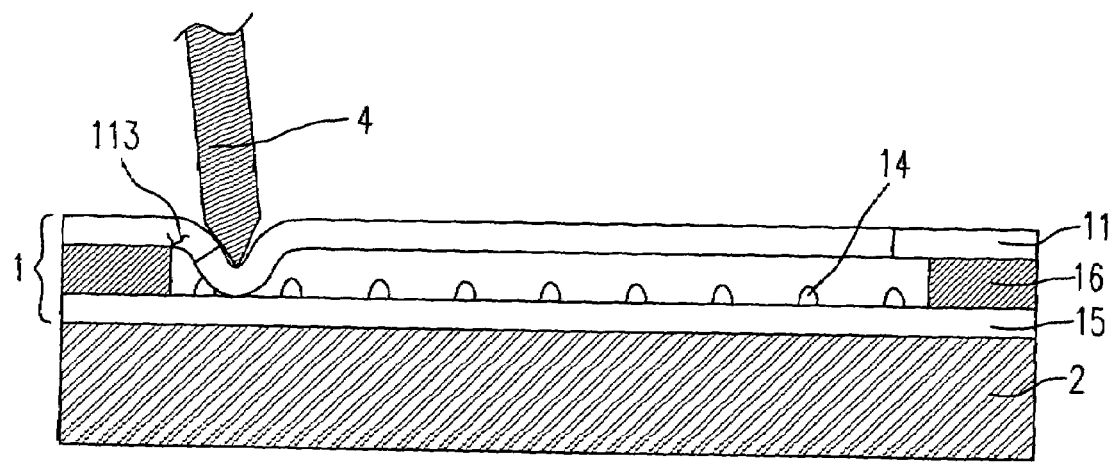
FIG. 3(B) shows the relative positions among the substrates and the insulating adhesion layer after being actuated by a touch according to the prior art.
Figure 4:
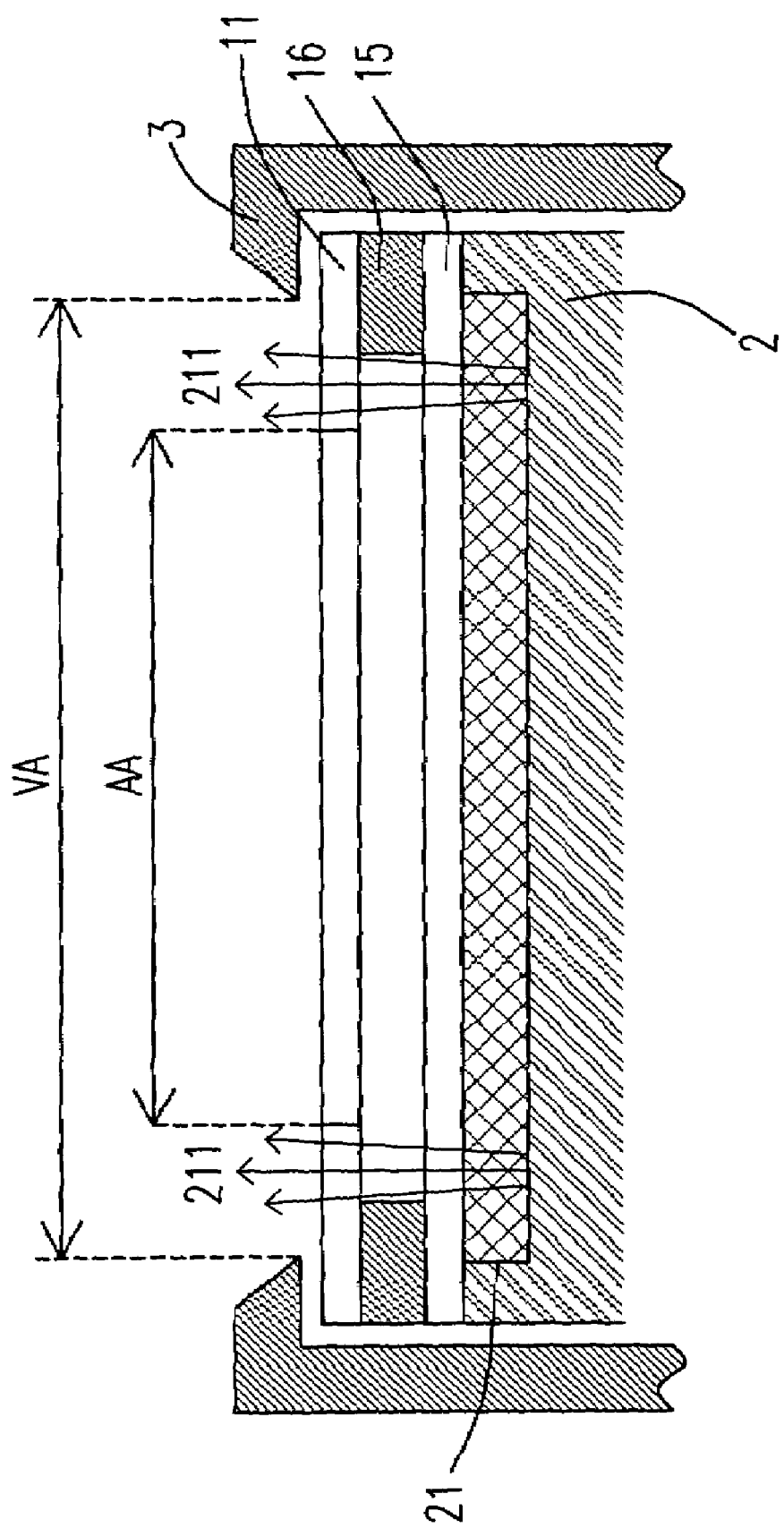
FIG. 4 is a schematic diagram showing the light leak of the prior display.

In addition, please refer to FIGS. 3(B), 5, 6(A) and 6(B) again. In FIGS. 6(A) and 6(B), when the touch panel is actuated by the silicon rubber 4, since an inward-extension width of the black insulating adhesion layer 163 is wider than the edge width of the frame 3, and an inward-extension width of the contacting surface 1631 is less than that of the contacting surface 1632, the inner sidewall of black insulating adhesion layer 163 from the contacting surface 1631 to the contacting surface 1632 is gradient and the occurrences of the cracks 113 of the first flexible substrate 11, as shown in FIG. 3(B), would decrease. Therefore, the lifespan of the touch panel according to this embodiment of the present invention is longer than that of the prior art.

Figure 7A:
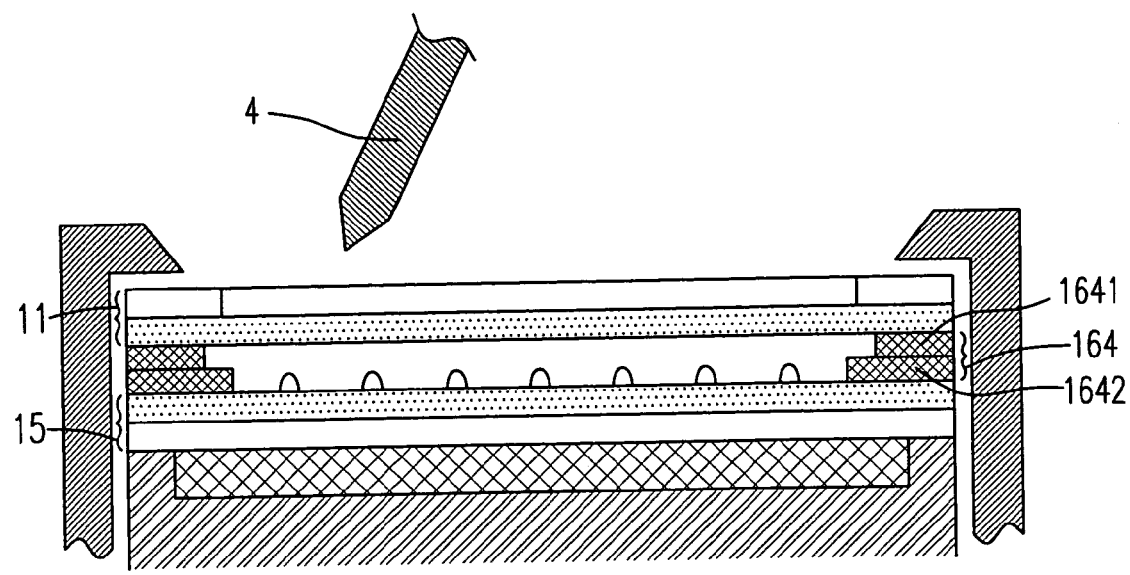
FIG. 7(A) shows the relative positions among the substrates and the insulating adhesion layer before being actuated by a touch according to a second embodiment of the present invention.
Figure 7B:
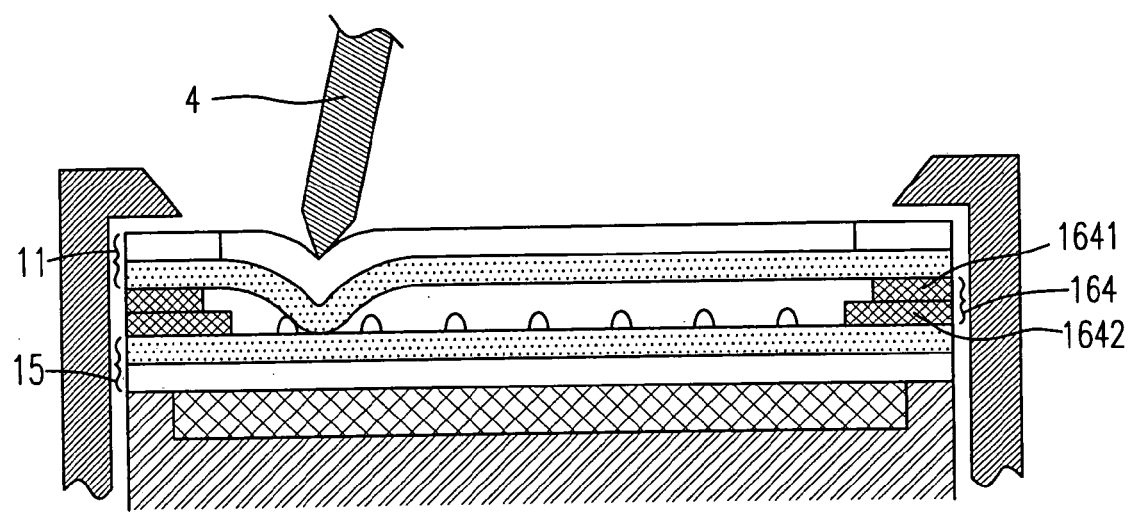
FIG. 7(B) shows the relative positions among the substrates and the insulating adhesion layer after being actuated by a touch according to a second embodiment of the present invention.

Please refer to FIGS. 7(A)–(B), which show the relative positions among the substrates and the black insulating adhesion layer before and after being actuated by a touch according to a second embodiment of the present invention. Please refer to FIGS. 6(A)–(B) and 7(A)–(B), the difference between the embodiments of FIGS. 6(A)–(B) and that of FIGS. 7(A)–(B) is that the black insulating adhesion layer 163 in FIGS. 6(A)–(B) is replaced by the stage-form black insulating adhesion layer 164, which includes the insulating layer 1641 and the insulating layer 1642. An inward-extension width of the insulating layer 1641 is less than that of the insulating layer 1642, and the occurrences of the cracks 113 of the flexible substrate 11, as shown in FIG. 3(B), would decrease accordingly.

It's should be noted that it's simple for one skilled in the art to change the practical forms of the embodiments of the present invention, such as to replace the insulating adhesion layers 163 and 164 by using multi layers or some similar modifications.

In view of the foresaid discussions, the present invention does provide a touch panel device having more beautifying appearance, longer lifespan, lower cost, and no occurrence of the light leak. Since the touch panel device according to the present invention does solve the faults of the prior arts but without increasing the cost, the present invention does have the novelties, progressivenesses, and the utilities.

While the invention has been described in terms of what is presently considered to be the most practical and embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch panel device, comprising:
    a first flexible substrate with a first surface;
    a frame rimming said first flexible substrate;
    a second substrate with a second surface facing said first surface; and
    a masking structure with a first contacting surface and a second contacting surface respectively adjacently to an edge portion of said first flexible substrate and an edge portion of said second substrate,
    wherein said masking structure extends inwardly into said first flexible substrate and said second substrate more than that of said frame does, and said second contacting surface extends inwardly into said first flexible substrate and said second substrate more than that of said first contacting surface does.

2. The touch panel device as claimed in claim 1, wherein said first contacting surface contacts said first surface, and said second contacting surface contacts said second surface.

3. The touch panel device as claimed in claim 1, wherein said first flexible substrate further comprises a touch surface for receiving a touch.

4. The touch panel device as claimed in claim 1, wherein said first flexible substrate and said second substrate are made of a transparent insulating material.

5. The touch panel device as claimed in claim 1, wherein said masking structure is made of an absorbent.

6. The touch panel device as claimed in claim 1, wherein said masking structure is black.

7. The touch panel device as claimed in claim 6, wherein said masking structure is made of an absorbent.

8. A touch panel device, comprising:
    a first flexible substrate with a first surface;
    a frame rimming said first flexible substrate;
    a second substrate with a second surface facing said first surface; and
    a masking structure formed by stacking a plurality of insulating layers and located between an edge portion of said first flexible substrate and an edge portion of said second substrate,
    wherein one of said plurality of insulating layers is adjacent to said first surface and extends inwardly into said first flexible substrate less than that of an insulating layer located therebelow does, and said insulating layer located therebelow extends inwardly into said first flexible substrate and said second substrate more than that of said frame does.

9. The touch panel device as claimed in claim 8, wherein said first flexible substrate further comprises a touch surface for receiving a touch.

10. The touch panel device as claimed in claim 8, wherein said first flexible substrate and said second substrate are made of a transparent insulating material.

* * * * *